United States Patent [19]
Noll et al.

[11] Patent Number: 4,819,198
[45] Date of Patent: Apr. 4, 1989

[54] SATURABLE CARRY-SAVE ADDER

[75] Inventors: Tobias Noll, Neckartailfingen; Walter Ulbrich, Puchheim, both of Fed. Rep. of Germany

[73] Assignee: Siemens Aktiengesellschaft, Berlin and Munich, Fed. Rep. of Germany

[21] Appl. No.: 883,657

[22] Filed: Jul. 9, 1986

[30] Foreign Application Priority Data

Jul. 12, 1985 [DE] Fed. Rep. of Germany ....... 3524981

[51] Int. Cl.$^4$ .............................. G06F 7/50; G06F 7/38
[52] U.S. Cl. ........................................ 364/787; 364/745
[58] Field of Search ....,.................... 364/768, 784–786, 364/787, 745, 737

[56] References Cited

U.S. PATENT DOCUMENTS

| | | | |
|---|---|---|---|
| 3,515,344 | 6/1970 | Goldschmidt | 364/786 |
| 3,609,568 | 9/1971 | Jackson | 364/724 |
| 4,104,729 | 8/1978 | Gingell | 364/757 |
| 4,110,832 | 8/1978 | Leininger et al. | 364/786 |
| 4,228,520 | 10/1980 | Letteney | 364/786 |
| 4,229,802 | 10/1980 | Eggermont | 364/786 |
| 4,379,338 | 4/1983 | Wishitani et al. | 364/745 |
| 4,706,209 | 11/1987 | Picco | 364/745 |
| 4,722,066 | 1/1988 | Armer et al. | 364/745 |

OTHER PUBLICATIONS

K. Hwang "Computer Arithmetic", (1979), pp. 98–103.
Proceedings of IEEE, vol. 63, No. 4, Apr. 1975, pp. 633–648.

Primary Examiner—Gary V. Harkcom
Assistant Examiner—Dale M. Shaw
Attorney, Agent, or Firm—Hill, Van Santen, Steadman & Simpson

[57] ABSTRACT

A carry-save adder for a bit-parallel addition of binary numbers in two's complement form incorporates a series of first adders for forming intermediate sum and carry words which are combined in an adder means to form a sum word. A decoder is provided for recognizing saturation of the carry-save adder and for generating overflow signals in dependence on the two most significant bits of the intermediate sum and carry words. When the overflow signals are generated, the recursive circuit branches are disconnected and saturation intermediate sum and carry words are substituted for the intermediate sum and carry words which yield sum words which do not exceed the permissible adder content.

17 Claims, 4 Drawing Sheets

SATURABLE CARRY-SAVE ADDER

BACKGROUND

The invention relates to an arrangement comprising a carry-save adder for bit-parallel addition of binary numbers in two's complement.

A carry-save adder of this type is known from the book *Computer Arithmethic* by K. Hwang, John Wiley & Sons, New York, 1979, pp. 98–103, particularly, FIG. 4.2. Every first adder has three inputs which are connected to equivalent bits of three binary numbers which are to be added to one another. The sum outputs of the first adders are connected to first inputs of the adder means and the carry outputs of the first adders (with the exception of the most significant first adder) are connected to second inputs of the adder means. A sum word appears at the outputs of the latter as the result of the addition. In contrast to an adder arrangement having ripple carry (carry-propagate principle), the carries of all the first adders are simultaneously formed by addition of three binary numbers, and are available as a carry word for addition in the adder means, being available at the same time as the intermediate sum word produced by the first adders. An adder constructed in this fashion works on what is referred to as the carry-save principle.

When binary numbers are externally supplied to the third inputs of the first adders, and a first intermediate result achieved by a preceding addition is supplied to the first two inputs, such first intermediate results being composed of an intermediate sum word supplied to the first inputs and of a carry word supplied to the second inputs, then a second intermediate result formed by addition of the first intermediate result and this number is produced at the outputs of the first adders.

A continuing formation of constantly new intermediate results which are obtained, given a continuous supply of further binary numbers via the third inputs, is referred to as an accumulation of these numbers. An overflow of the sum word can then occur, in that the allowable adder content which is dependent on the prescribed plurality of first adders is upwardly (or downwardly) exceeded for positive (or negative) contents. With a carry-save adder employed in recursive circuits, such an overflow frequently means that the adder contact begins to periodically change between two limit values, whereby the constantly changing sum word at the output of the adder means corresponds to an analog oscillation. Such behavior of an adder in a recursive circuit is described in Proc. of the IEEE, Vol. 63, No. 4, April 1975, pp. 633–648, cf., in particular, FIGS. 5 and 6 and the appertaining text of page 636.

BRIEF DESCRIPTION OF THE INVENTION

The object of the present invention is to provide an arrangement wherein an overflow of the accumulated sum word is reliably avoided.

The advantage obtainable with the invention is that intermediate sum words or carry words that can lead to an overflow of the sum word are directly employed for the recognition of a overflow situation and for the elimination thereof. Uncontrolled fluctuation of the sum word are thereby suppressed.

BRIEF DESCRIPTION OF THE DRAWINGS

The invention shall be set forth in greater detail below with reference to preferred exemplary embodiments shown in the drawings, in which.

DESCRIPTION OF THE PREFERRED EMBODIMENTS

Figure 1:
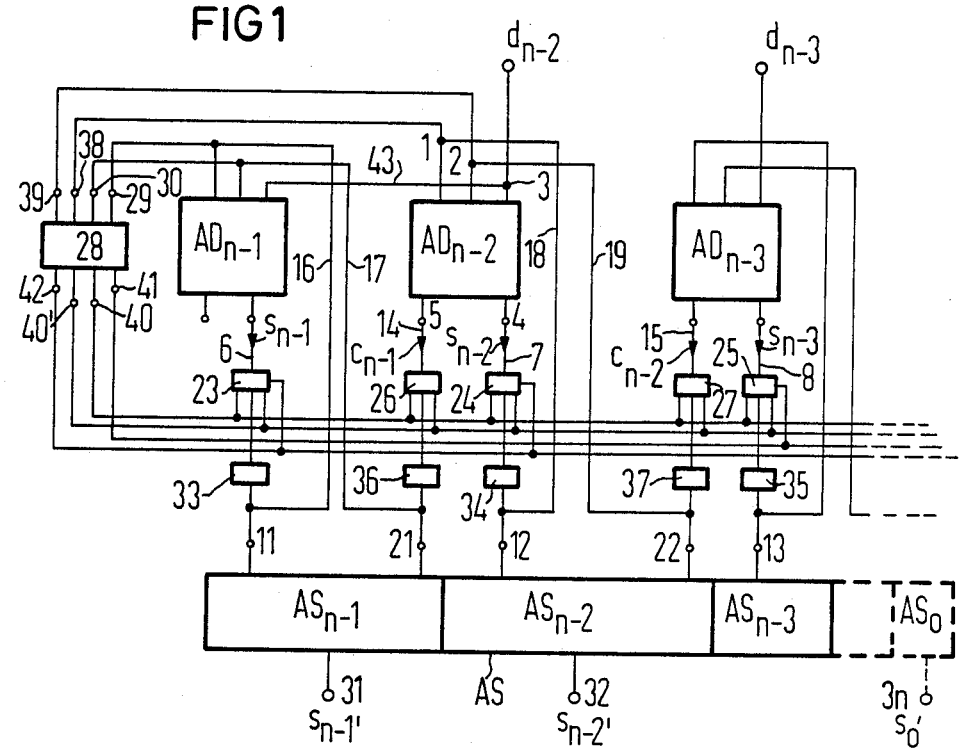
FIG. 1 is a functional block diagram of an arrangement fashioned in accord with the invention comprising a carry-save adder for bit-parallel addition of three binary numbers.

FIG. 1 shows three adders $AD_{n-1}$, $AD_{n-2}$ and $AD_{n-3}$ each having three inputs, for example 1 through 3, for equivalent bits of three binary numbers represented in two's complement which are to be added to one another, producing a sum output, for example 4, and a carry output, for example 5. For the addition of n-place binary numbers, FIG. 1 is expanded by further adders $AD_{n-4}$ . . . $AD_0$ which corresponds to those shown in terms of structure and function. The sum outputs of the adders $AD_i$ are wired to output lines, for example 6 through 8, which are connected to first inputs 11, 12, 13 . . . of an adder means AS. The carry outputs of the adders $AD_i$, with the exception of $AD_{n-1}$, are wired to output lines 14, 15 . . . which are respectively connected to second inputs 21, 22 . . . of AS. The adder means AS has outputs 31, 32 . . . 3n. AS is composed, for example, of n adders $AS_{n-1}$ . . . $AS_0$ each having three inputs and an output. The first two inputs of $AS_{n-1}$ correspond to the inputs 11 and 21 of AS and the output of $AS_{n-1}$ correspond to the output 31 of AS. $AS_{n-2}$ has two inputs 12, 22 and an output 32, etc. The third input (not shown) of $AS_{n-1}$ is connected to carry output of $AS_{n-2}$ and the third input (not shown) of $AS_{n-2}$ is connected to the carry output of $AS_{n-3}$, etc.

A recursive circuit branch 16 connects the output line 6 from the sum output of $AD_{n-1}$ to the first input of this adder. A second recursive circuit branch 17 connects the output line 14 from the carry output 5 of $AD_{n-2}$ to the second input of $AD_{n-1}$. In a corresponding fashion, recursive circuit branches 18, 19 are connected to the first two inputs 1, 2 of $AD_{n-2}$ and respectively further recursive circuit branches are connected to the first two inputs of the remaining adders $AD_i$. Respective logic circuits 23 through 25 are inserted into the output lines 6 through 8 and further logic circuits 26 and 27 are inserted into the output lines 14 and 15. Further, respective intermediate memories which are preferably shift registers, 33 through 37 are inserted into the output lines 6 through 8, 14 and 15. The recursive circuit branches, for example 16, 17, receive signals from the appertaining output lines, for example 6, 14, through the logic circuits 23 through 27 and the intermediate memories 33 through 37.

A decoder 28 comprises four inputs 29, 30, 38 and 39, of which 29 and 30 are connected to the first two inputs of $AD_{n-1}$, and 38 and 39 are connected to the first two inputs of $AD_{n-2}$. Outputs 40 and 40' of 28 are wired to inputs of all logic circuits, for example 23 through 27. The output 41 of 28 is connected to the inputs of some logic circuits, for example 25, which follow downstream of the sum outputs of the adders $AD_i$, whereas the output 42 is connected to the inputs of the remaining logic circuits, for example 23 and 24, which follow downstream of the sum outputs of $AD_i$.

An (n−1)-place binary number D represented in two's complement made up of the bits $d_{n-2}, d_{n-3} \ldots d_0$ is applied to the third inputs of $AD_i$, whereby the most significant bit $d_{n-2}$ is supplied to the third inputs of $AD_{n-1}$ and $AD_{n-2}$ because of the connected 43. The number D is thus expanded into an n-place number by doubling its operational sign bit. Neglecting the logic circuits 23 through 27, after the execution of a bit-parallel addition in the adders $AD_i$, the bits $d_{n-2}, d_{n-03} \ldots$ also appear at the sum outputs thereof, and are written into the intermediate memories 33 through 35. With a clock pulse, these bits are then connected through and supplied to the first inputs, for example 1, of $AD_i$ via the recursive circuit branches 16, 18 . . . , and a new binary number D1 is simultaneously applied to the third inputs of $AD_i$. After the execution of an addition, a first intermediate result corresponding to the sum of D+D1 is obtained in the form of an intermediate sum word at the sum outputs and a carry word at the carry outputs of $AD_i$. The bits of the intermediate sum word are written into the intermediate memories 33, 34 . . . and the bits of the carry word are written into the intermediate memories 36, 37 . . . . At the appearance of a further clock pulse, the bits of the intermediate sum word are connected through to the first inputs of $AD_i$ and the bits of the carry word are connected through to the second inputs thereof, whereby a further binary number D2 is applied to the third inputs of $AD_i$. After the execution of a following addition, a second intermediate result is available at the outputs of $AD_i$, this corresponding to the sum of D+D1+D2 and being written into the intermediate memories 33 through 37. At every further clock pulse, a new number Di is then applied to the third inputs, and after an addition step, a new intermediate result is obtained, which is composed of the sum of the previously accumulated intermediate result and the respective number Di.

The intermediate results, which are respectively present in the form of an intermediate sum word S having the bits $s_{n-1}, s_{n-2} \ldots$ at the inputs 11, 12, 12 . . . and a carry word C having the bits $c_{n-1}, c_{n-2} \ldots$ at the inputs 21, 22 . . . of AS, are combined in AS to form sum words S' having the bits $s_{n-1}', s_{n-2}' \ldots s_0'$ which appear at the outputs 31, 32 . . . 3n. An arrangement constructed in accord with FIG. 1 and operated in this way is also referred to as an accumulator; its output signal S' is referred to as the respectively accumulated accumulator word which identifies the respecive accumulator content.

When, given an accumulator of FIG. 1 comprising n=5, an intermediate sum word S=01110 represented in two's complement is applied to the first inputs of $AD_i$, a carry word C=0111 is applied to the second inputs and a binary number D=00011 is applied to the third inputs, a new intermediate sum word S1=00011 and a new carry word C1=1110 are produced by the execution of a bit-parallel addition. Since S, C and D respectively correspond to 14, 14 and 3 in decimal notation, an accumulator word which corresponds to the (correct) result of 31 would be anticipated when they are added. However, the new intermediate sum word S1 appearing at the outputs of $AD_i$ corresponds to a decimal number +3 and the new carry word C1 corresponds to a decimal number of −4, so that an accumulator word that corresponds to a (wrong) result of −1 derives therefrom. This is to be attributed to an overflow situation which has arisen in that an accumulator content of 31 can no longer be represented given an accumulator word width of n=5.

The decoder 28 serves for the identification of such overflow situations which lead to incorrect intermediate results. In accord with a preferred development of the invention, a first overflow condition, to which the decoder 28 responds with a first overflow signal, arises in that the bits $s_{n-1}$ and $c_{n-1}$ presented to these inputs 29 and 30 are both 0 and at least one of the bits $s_{n-2}$ and $c_{n-2}$ presented to the inputs 38 and 39 has the value 1. This condition is referred to as positive overflow condition and the inverted overflow signal produced at the output 41 is referred to as $+\overline{OVFL}$. A second, negative overflow condition, to which the decoder 28 reacts with a negative inverted overflow signal $-\overline{OVFL}$ emitted at its output 42, is present when the bits $s_{n-1}$ and $c_{n-1}$ presented to the inputs 29 and 30 are both 1 and when at least one of the bits $s_{n-2}$ and $c_{n-2}$ presented to inputs 38 and 39 has the value 0. Upon appearance of one of the signals $+\overline{OVFL}$ or $-\overline{OVFL}$, signals ORALL having the value 1 and $\overline{ORALL}$ having the value 0 are produced via the outputs 40 and 40'.

Upon the saturation of the accumulator, with the appearance of one of these two overflow conditions, the logic circuits, for example 26, 27 . . . , at the carry outputs of $AD_i$ are controlled by the signals ORALL and $\overline{ORALL}$ to disconnect the carry bits $c_{n-1}, c_{n-2}$ presented to their outputs, these carry bits being otherwise connected through their outputs. Instead of these bits, saturation carry bits 0 are emitted via the outputs of all these logic circuits.

Further, upon the appearance of the positive overflow condition, the logic circuits 23, 24 at the sum outputs of the two most significant adders $AD_{n-1}$ and $AD_{n-2}$ are influenced such by the signals $-\overline{OVFL}$, ORALL and $\overline{ORALL}$ so as to disconnect the intermediate sum bits $s_{n-1}$ and $s_{n-2}$ present at their inputs—these intermediate sum bits being otherwise connected through to their outputs—and respectively replace them with saturation intermediate sum bits having the value 0. $+\overline{OVFL}$, ORALL and $\overline{ORALL}$ also control the logic circuits, for example 25, connected to the sum outputs of the adders $AD_{n-3} \ldots AD_0$, to disconnect the intermediate sum bits, these intermediate sum bits being otherwise connected through to their outputs—and replace them with saturation inermediate sum bits having the value 1.

Upon appearance of the negative overflow condition, the logic circuits 23, 24 at the sum outputs of the two most significant adders $AD_{n-1}$ and $AD_{n-2}$ are controlled by the signals ORALL, $\overline{ORALL}$ and $-\overline{OVFL}$ that they disconnect the intermediate sum bits $s_{n-1}$ and $s_{n-2}$ presented to their input sides from their outputs and replace them by saturation intermediate sum bits having the value 1. $+\overline{OVFL}$, ORALL and $\overline{ORALL}$ further control the logic circuits, for example 25, connected to the sum outputs of the adders $AD_{n-3} \ldots AD_0$ to disconnect the intermediate sum bits present at their inputs from their outputs and respectively replace them with saturation intermediate sum bits having the value 0.

The saturation measures set forth above can be generalized to the effect that the output lines, for example 6 through 8 and 14, 15, at the outputs of the adders $AD_i$ are disconnected from the intermediate sum words S and carry words C produced by the adders $AD_i$, upon the appearance of overflow conditions, and instead produce prescribed saturation intermediate sum words and saturation carry words. For the case of a positive (or negative) saturation condition, the saturation intermediate sum word and saturation carry words are selected such that they yield a sum word S' whose appertaining accumulator content comes as close as possible to a limit value for which the positive (or negative) overflow conditions is already valid, without reaching or exceeding this limit value, regardless of how the accumulator word is composed. This condition is met in the numerical example cited for a 5-bit accumulator with a saturation carry word of 0000 and a saturation intermediate sum word of 00111 on the occurence of a positive overflow condition, and with a saturation intermediate sum word of 11000 on the occurence of a negative overflow condition.

Figure 2:
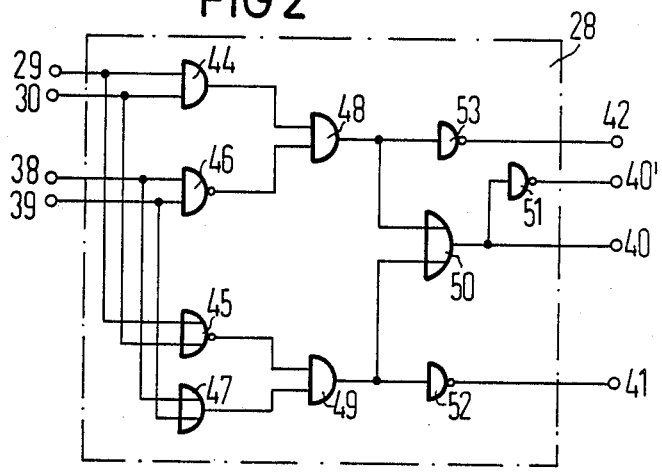
FIG. 2 is a schematic diagram of an exemplary circuit of a first sub-circuit according to FIG. 1.

FIG. 2 shows an exemplary embodiment of the decoder 28 of FIG. 1. The inputs 29 and 30 are connected to the inputs of an AND gate 44, as well as to the inputs of a NOR gate 45. The inputs 38 and 39 are connected to the inputs of an NAND gate 46, as well as to the inputs of an OR gate 47. The outputs of 44 and 46 are connected to the inputs of an AND gate 48 and the outputs of 45 and 47 are connected to the inputs of an AND gate 49. The outputs of 48 and 49 in turn are connected to an OR gate 50, whose output forms the output 40 of the decoder 28, and the output 40' via an inverter 51. The output of gate 49 is wired to an inverter 52 whose output produces the output 41 of the decoder. The output of 48 is also wired to an inverter 53 whose output produces the output 42 of the decoder. When the lines 29, 30, 38 and 39 are supplied with the respective bits $s_{n-1}$, $c_{n-1}$, $s_{n-2}$ and $c_{n-2}$, the positive overflow signal +OVFL is produced at the output of and AND gate 49 and the negative overflow signal −OVFL is produced at the output of 48. The signal ORALL is then available at the output 40 of the OR gate 50 and the signal $\overline{ORALL}$ is available at the output 40'. The inverted overflow signal +OVFL and −OVFL appear at the outputs 41 and 42.

Figure 3:
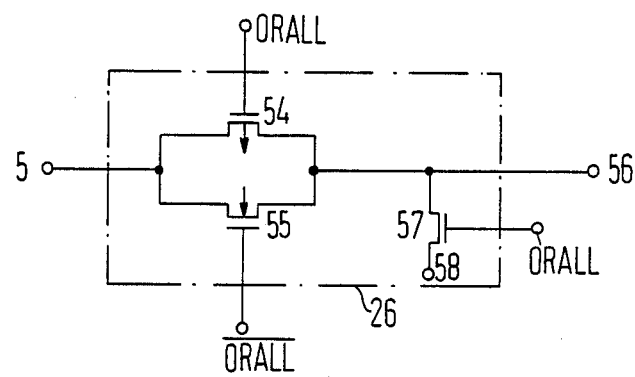
FIG. 3 is a schematic diagram of an exemplary circuit of a second sub-circuit according to FIG. 1.

FIG. 3 shows an exemplary embodiment of the logic circuit 26 which follows downstream from the carry output 5 of $AD_{n-2}$. In accord with FIg. 3, two switched transistors 54 and 55 have their switched paths lying parallel to one another, with the first designated as a p-channel field effect transistor and the second designed as an n-channel field effect transistor. The source terminals of these transistors are connected to the input of the logic circuit 26 which is in communication with the carry output 5 of FIG. 1 and the drain terminal of these transistors are connected to an output 56 of 26 which is wired to the input of the intermediate memory 36. The output 56 is connected via a further n-channel switching transistor 57 to a circuit point 58 which lies at reference potential. The gates of 54 and 57 receive the signal ORALL and the gate of 55 receives the signal $\overline{ORALL}$ which is inverted with respect thereto. The remaining logic circuits, for example 27, which are connected downstream of the carry outputs of the adders $AD_{n-3} \ldots AD_0$ are likewise fashioned in accord with FIG. 3.

Figure 4:
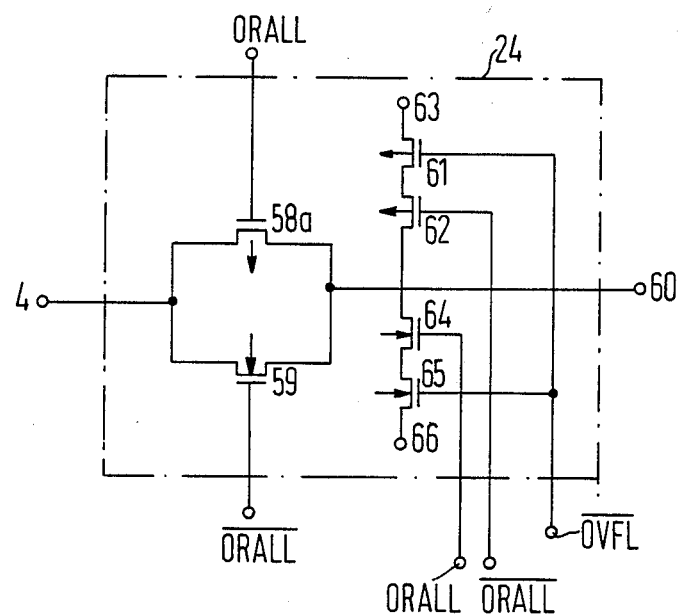
FIG. 4 is a schematic diagram of an exemplary circuit of a third sub-circuit according to FIG. 1.

FIG. 4 shows an exemplary embodiment of the logic circuit 24. Two switching transitors 58a and 59 have their switched paths lying parallel to one another with their source terminals connected to a circuit point in communication with the sum output of $AD_{n-2}$. The drain terminals of 58a and 59 are connected to a circuit poin 60 which represents the output of 24. Via the series circuit of two p-channel switching transistors 61 and 62, the circuit point 60 is connected to a terminal 63 which is wired with the supply voltage, and through two n-channel switching transistors 64 and 65, to a terminal 66 lying at reference potential. The gates of the p-channel transistor 58a and the transistor 64 are driven with the signal ORALL via the output 40 and the gates of the n-channel transistor 59 and of the transistor 62 are driven with the inverted signal $\overline{ORALL}$ output via the output 40'. The gates of transistors 61 and 65 are connected to the output 42 of 28 receive with −OVFL. The logic circuit 23 is also expediently constructed in accord with FIG. 4.

The logic circuit 25 is advantageously constructed in accord with FIG. 4, whereby the signal +OVFL is merely employed for the drive of the transistors 61 and 65 instead of the signal −OVFL. The logic circuits which are connected downstream of the sum outputs of the further adders $AD_{n-4} \ldots AD_0$ are likewise fashioned in accord with the logic circuit 25.

With this circuit-oriented design of the logic circuits at the outputs of $AD_i$ and with the decoder of FIG. 2, the accumulator of FIG. 1 is loaded with a saturation carry word of 0000 and a saturation intermediate sum word of 00111 on the appearance of the afore-mentioned, positive overflow condition and with a saturation carry word of 0000 and with a saturation intermediate sum word of 11000 on the appearance of the negative overflow condition.

Figure 5:
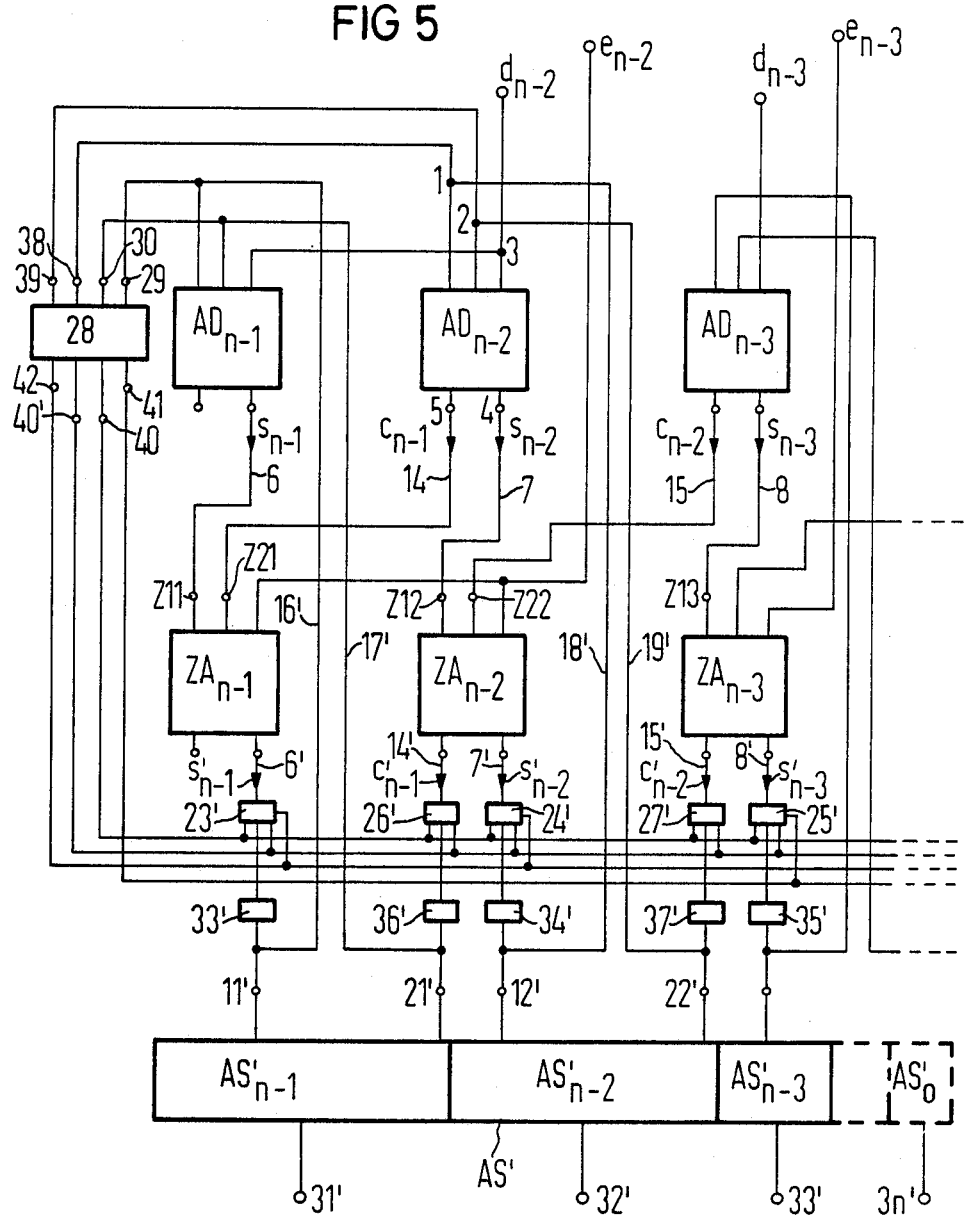
FIG. 5 is a functional block diagram of an arrangement of the invention comprising a carry-save adder for bit-parallel addition of four binary numbers.

FIG. 5 shows the development of an arrangement of FIG. 1 which serves for the bit-parallel addition of four binary numbers in two's complement. The group of adders $AD_i$ already shown in FIG. 1 is followed by an additional group of adders $ZA_i$, with every adder $ZA_i$ having three inputs. Neglecting the logic circuits 23 through 27 and of the intermediate memories 22' through 37', the output lines of $AD_i$ are connected to the inputs of the adders $ZA_i$. In detail, the output lines 6 through 8 are respectively connected to the first inputs Z11, Z12 and Z13 of $ZA_{n-1}$, $ZA_{n-2}$ and $ZA_{n-3}$ and the output lines 14 and 15 are connected to the second inputs Z21 and Z22 of $ZA_{n-1}$ and $ZA_{n-2}$. Generally, the sum output of the adder $AD_i$ is connected to the first input of the adder $ZA_i$ which follows it, whereas the carry output of $AD_i$ is wired to the second input of the adder $ZA_{i+1}$ of the next-higher significance. At their outputs, the additional adders $ZA_i$ are wired in the same way and to the same circuit parts as the adders $AD_i$ in FIG. 1. These circuit parts are therefore provided with the same refernce characters as in FIG. 1 but with the addition of a reference prime. The intermediate sum word appearing at the points 11', 12' ..., which is applied to the first inputs of $AD_i$ via the intermediate memories 33', 34' ..., represents a first binary number and the carry word appearing at the points 21', 22' ... which is applied to the second inputs of $AD_i$ via the intermediate memories 36', 37' ... respresents a second binary number. The number D adjacent to the third inputs of $AD_i$ forms a third binary number and number E applied to the third inputs of the additional adders $ZA_i$ forms a fourth binary number. These four binary numbers are added to one another in bit-parallel relationship with the adder of FIG. 5. The intermediate sum words and carry words from which the desired sum word S" are formed in the adder means AS', and appear at the circuit points 11', 12' ... and 21', 22' .... Dependent on the bits at the first two inputs of $AD_{n-1}$ and $AD_{n-2}$, the decoder 28 determines whether a positive or a negative overflow condition is present. When this is the case, the saturation measures already set forth with reference to FIG. 1 are initiated, via the outputs 40, 40', 41 and 42 of the decoder 28 and by means of the logic circuits 23' through 27', etc.

By connecting further groups of adders following the adders $ZA_i$, the arrangement of FIG. 5 can be expanded in a corresponding fashion for an additional five or more binary numbers in two's complement. The circuit parts 23' through 27' and 33' through 37' are then provided at the outputs of the further adders arranged in the lowest adder group and immediately preceding the adder means AS'. The recursive circuit branches likewise proceed from the outputs of the intermediate memories 33' through 37' to the inputs of the adders $AD_i$. Circuit arrangements formed from a plurality of adder lines for the addition of five or more binary number are described, for example, in the book *Computer Arithmetic* by K Hwang, John Wiley & Sons, New York, 1979, pp. 100–103, cf., in particular, FIG. 4.3.

Figure 6:
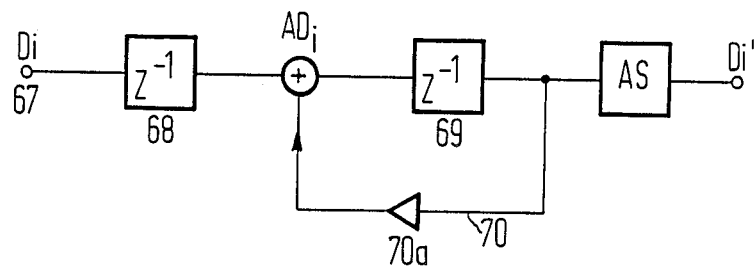
FIG. 6 is a functional block diagram of an example of an application of an arrangement according to FIG. 1.

FIG. 6 shows a recursive filter of the first order which contains an accumulator like that of FIG. 1. A sequence of n-place binary numbers Di represent in two's complement is applied in bit-parallel to the input 67 during successive clock periods, and corresponds to a sequence of sampled amplitude values of an analog input signal. The sequence is first related bit-parallel by one clock period duration in a delay stage 68 composed of n-intermediate memories, and is then respectively supplied to the third inputs of the accumulator $AD_i$ of FIG. 1. The intermediate sum words and carry words respectively derived therefrom are delayed by a further clock period duration in a delay stage 69 composed of the intermediate memories 33 through 37, etc., and are then supplied to the first and second inputs of the accumulator $AD_i$ via a recursive loop. Both words may be shifted m bits to the right or left in their allocation to the individual adders $AD_i$, this corresponding to a multiplication by $2^{-m}$ or $2^m$ in an evaluator 70a. The word supplied via the line 70 are added to the binary number D pending at the third inputs of $AD_i$ at the next following clock pulse. The intermediate sum words and carry words appearing at the output of the delay stage 69 are supplied to the adder means AS via its inputs 11, 12 . . . 21, 22 . . . are combined to form the filtered, digital output signal Di'.

Figure 7:
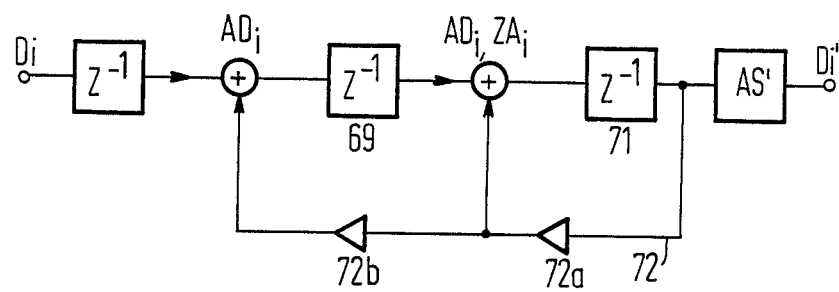
FIG. 7 is a functional block diagram of an example of an application of an arrangement according to FIG. 5.

FIG. 7 shows a recursive filter of the second order which differs from FIG. 6 in that the intermediate sum words and carry words emitted by the delay unit 69 are supplied to an accumulator (like that of FIG. 5) which is referenced $AD_i$, $ZA_i$. The intermediate sum words and carry words emitted by this are delayed by a clock period duration in a delay stage 71 (which corresponds to the intermediate memories 33' through 37') and, via a recursive loop 72, are supplied both to the first two inputs of the accumulator $AD_i$ as well as to the first two inputs of the $AD_i$, $ZA_i$. Both words can be shifted by m1 bits toward the right or left in the allocation to the individual adders $AD_i$ of the accumulator of FIG. 5, this corresponding to a multiplication by $2^{-m1}$ or $2^{m1}$ in an evaluator 72a. The words which have been evaluated in this fashion can then be shifted by a further m2 bits toward the right or left in their allocation to the individual adders $AD_i$ of the accumulator of FIG. 1, this corresponding to a further multiplication by $2^{-m1}$ or $2^{m2}$ in an evaluator 72b. The third input of $AD_i$ receives Di and the third input and fourth input of $AD_i$, $ZA_i$ receives the intermediate sum words and carry words of the first accumulator output via 69. The intermediate sum words and carry words appearing at the output of the delay stage 71 are supplied to the adder stage AS' via this input 11', 12' ... 21', 22' and are combined to form the filtered, digital output signal Di'.

In a recursive filter of the $n^{th}$ order, one accumulator like that of FIG. 2 in n−1 accumulators like that FIG. 5 can be employed in an analogous fashion.

The intermediate memories 33 through 37 (or, 33' through 37'), etc., can be advantageously fashioned as shift registers which are each composed of master-slave flipflops. The adder means AS or AS' can be fashioned in accord with the adder means shown in FIG. 9 of our U.S. patent application Ser. No. 883,942, filed July 10, 1986, and set forth in detail therein.

Finally, the adder $AD_{n-1}$ can comprise a correction element at its output which undertakes an overflow correction that is needed when relatively large intermediate sum words and carry words of opposite operational signs combine to form a relatively small sum word. By means of such a correction element, the carry word of the adder $AD_{n-2}$ having the second-highest signficance is replaced by the carry bit of the most significant adder $AD_{n-1}$ and, when the carry bits of the two most significant adders $AD_{n-1}$ and $AD_{n-2}$ are unequal, the sum bit of $AD_{n-1}$ is replaced by the carry bit of $AD_{n-1}$. Such overflow correction measures are set forth in detail in the U.S. patent application Ser. No. 883,942. One can proceed on the assumption that the intermediate sum words and carry words established on the output lines, for example 6 through 8, 14 and 15, are already corrected in this fashion upon employment of such a correction element incorporated into the circuit block for $AD_{n-1}$. The intermediate sum words and carry words of the adders $ZA_i$ and of further adder groups are expediently corrected in analogous fashion with respect to such an overflow, whereby corresponding correction elements are also incorporated into the block $ZA_{n-1}$ and into the blocks for the respectively most significant adders of further adder groups.

In a departure from the exemplary embodiments of FIGS. 1 and 5, in addition to the two most significant adders, for example $AD_{n-1}$ and $AD_{n-2}$, of every group, further adders of contiguous significance, for example $AD_{n-3}$ and $AD_{n-4}$, can also be connected to receive one and the same bit of a supplied binary number D or, respectively, E, via their respective third inputs. Such an arrangement corresponds to an operation sign multiplication of the binary numbers represented in two's complement.

What is claimed is:

1. In a carry-save adder for a bit-parallel addition of binary numbers in two's complement having a first group of adders ($AD_i$) with first and second inputs for binary number bits of the same significance, and outputs for producing intermediate sum and carry words, adder means (AS) for receiving said intermediate sum and carry words and combining them to form sum words, and recursive connections by which said intermediate sum words are supplied to said first and second inputs of said first adders (AD$_i$), and said first adders having third inputs for receiving externally supplied binary number bits, the combination comprising: a decoder, means for connecting said decoder with the two most significant bits of said intermediate sum and carry words and operative to generate overflow signals in response to prescribed input bit patterns for indicating the imminent transgression of a permissible adder content, and a plurality of logic circuits connected in said recursive connections and connected to receive said overflow signals and responsive thereto for disconnecting said intermediate sum and carry words from said recursive circuit branches and for substituting therefor predetermined saturation intermediate sum words and predetermined saturation carry words which yield sum words which do not exceed the permissible adder content.

2. Apparatus according to claim 1 including a plurality of first intermediate memories connected to the outputs of said logic circuits for receiving and storing said intermediate sum and carry words or said saturation intermediate sum and carry words, means for supplying said intermediate memories with clock pulses at a prescribed clock frequency, said intermediate memories being loaded in synchronism with said clock pulses, and means for supplying said third inputs to said first adders in synchronism with said clock pulses.

3. Apparatus according to claim 2 including means for selectively connecting said first and second inputs of said first adders respectively to the intermediate memories which are associated with the first and second intermediate sum and carry bits of said first adders, or alternatively connecting selected outputs of said intermediate memories to the first and second inputs of said first adders so as to shift each of said first and second inputs by a constant number of orders.

4. A digital filter incorporating the apparatus of claim 2 wherein said first group of adders (AD$_i$) are connected to receive intermediate sum and carry words supplied via a recursive loop and added to digital words corresponding to digitized amplitude values of input signals supplied via the third inputs of said first adders, said intermediate memories being operative to introduce a delay in the supply of said intermediate sum and carry words to said first adders, said adder means (AS) forming the digitized amplitude of the values of the filtered input signals (Di').

5. Apparatus according to claim 1 including a further group of adders (ZA$_i$) interposed between the outputs of said first adders and the inputs of said logic circuits, said further adders each having third inputs to receive further externally supplied binary number bits, means for supplying clock pulses at a prescribed clock frequency to said intermediate memories, said intermediate memories being loaded in synchronism with said clock pulses, and means for supplying the third inputs of said adders of said further group in synchronism with said clock pulses.

6. Apparatus according to claim 5 including another group of adders interconnected between first adders and said further group of adders, and another group of intermediate memories interconnected between the output of said another group of adders and the inputs of said further group of adders, said another group of adders having third inputs for receiving a another external sequence of binary numbers, means for supplying clock pulses to said another group of intermediate memories for causing them to operate in synchronism with said clock pulses, and means for supplying said third inputs of said another group of adders in synchronism with said clock pulses.

7. Apparatus according to claim 5 including means for selectively connecting the first and second inputs of said first adders respectively to said intermediate memories associated with the intermediate sum bit of the same order and the intermediate carry bit of the next-lower order, or alternatively connecting said first and second inputs of said first adders to said intermediate memories such that said inputs are shifted by constant number of orders.

8. A digital filter incorporating the apparatus of claim 7, wherein said first adders (AD$_i$) and said further group of adders (ZA$_i$) are operative for the addition of intermediate sum and carry words supplied to the first and second inputs of said first adders (AD$_i$), by way of a recursive loop of the second order, with intermediate sum and carry words of a first accumulator which are supplied via third inputs of said first adders (AD$_i$), and via third inputs of said further group of adders (ZA$_i$), said intermediate memories being operative for delaying application of said intermediate sum and carry words to said first and second inputs of said first adder, said adder means (AS) forming the digitized amplitude value of the filtered input signal (D').

9. Apparatus according to any of claims 1–3 or 5–7 wherein said decoder comprises a logic unit for producing a positive overflow signal in response to intermediate sum and carry bits ($s_{n-1}$, $c_{n-1}$) applied to the first and second inputs of the most significant first adder which are both 0, and in further response to one of the intermediate sum and carry bits ($s_{n-2}$, $c_{n-2}$) applied to the first and second inputs of the first adder (AD$_{n-2}$) having the next-lower significance being 1.

10. Apparatus according to any of claims 1–3 or 5–7 wherein said decoder generates a negative overflow signal in response to intermediate sum and carry bits ($s_{n-1}$, $c_{n-1}$) applied to the first and second inputs of the most significant first adder (AD$_{n-1}$) which are both 1, and in further response to at least one of the intermediate sum and carry bits ($s_{n-2}$, $c_{n-2}$) applied to the first and second inputs of the first adder (AD$_{n-2}$) having the next-lowest significance being 0.

11. Apparatus according to any of claims 1–3 or 5–7 wherein said decoder includes means for generating a general overflow signal on the appearance of either the positive or negative overflow signal.

12. Apparatus according to any of claims 1–3 or 5–7 wherein each of said logic circuits is able to emits saturation intermediate sum and carry words in which all bits of said saturation intermediate carry word are 0, the two most significant bits of said saturation intermediate sum word are 0 and the remaining bits of said saturation intermediate sum word are 1.

13. Apparatus according to any of claims 1–3 or 5–7 wherein said logic circuits emit saturation intermediate sum and carry words in response to a negative overflow signal, whereby all bits of said saturation intermediate carry word are 0, the two most significant bits of said saturation intermediate sum word are 1, and the remaining bits of said saturation intermediate sum word are 0.

14. Apparatus according to any of claims 1–3 or 5–7 wherein said intermediate memories are constructed of shift registers composed of a plurality of master-slave flipflops.

15. Apparatus according to claim 1 wherein said decoder comprises a first AND gate having inputs connected to the first two inputs of the most significant first adder ($AD_{n-1}$), and NAND gate having inputs connected to the two first inputs of the first adder ($AD_{n-2}$) having the next higher significance, a NOR gate having inputs connected in parallel with those of said first AND gate, a first OR gate having inputs connected in parallel with those of said NAND gate, means for connecting the outputs of said first AND gate and said NAND gate to the inputs of a second AND gate, means for connecting the outputs of said NOR gate and said first OR gate to the inputs of a third AND gate, a first inverter connecting the output of said second AND gate to a decoder output for manifesting an inverse negative overflow signal, a second inverter for connecting the output of said third AND gate to a decoder output for manifesting an inverse positive overflow signal, a second OR gate having inputs connected to the outputs of said second and third AND gates for manifesting an output corresponding to a general overflow signal, and an inverter connected to the output of said second OR gate for manifesting an output corresponding to an inverse general overflow signal.

16. Apparatus according to claim 15 wherein said logic circuits comprise two field effect transistors with different channel types having their source terminals connected in common to an input of said logic circuit and their drain terminals connected in common to an output of said logic circuit, means for connecting a gate of one of said transistors to said general overflow signal, means for connecting the gate of the other transistor to the inverse general overflow signal and a further field effect switching transistor connected between the output of said logic circuit and a reference potential, and means for connecting the gate of said further transistor to said general overflow signal.

17. Apparatus according to claim 16 wherein said logic circuits comprise two further field effect switching transistors of different channel types having their source terminals connected in common to an input of said logic circuit and their drain terminals connected in common to an output of said logic circuit, means for connecting the gate of one of said further transistors to the general overflow signal, means for connecting the gate of the other of said further transistors to the inverse general overlow signal, a first series circuit of two field effect transistors of one channel type being connected between the output of said logic circuit and a supply voltage, said output of said logic circuit being connected by a second series circuit of two field effect switching transistors of the other channel type to a reference potential, means for connecting one of said transistors of said first and second series circuits to the positive or negative overflow signal and for connecting the other transistor of one of the series circuits with said general overflow signal and the other transistor of the other series circuit with said inverse general overflow signal.

* * * * *